United States Patent [19]

Juanarena

[11] Patent Number: 4,644,482

[45] Date of Patent: Feb. 17, 1987

[54] DIGITAL PRESSURE TRANSDUCER AND CORRECTIONS CIRCUITRY SYSTEM

[75] Inventor: Douglas B. Juanarena, Newport News, Va.

[73] Assignee: Pressure Systems Incorporated, Hampton, Va.

[21] Appl. No.: 685,252

[22] Filed: Dec. 21, 1984

[51] Int. Cl.[4] .................. G01N 7/00; G06F 15/32
[52] U.S. Cl. ........................... 364/558; 364/557; 364/571; 73/579
[58] Field of Search .............. 364/557, 558, 571

[56] References Cited

U.S. PATENT DOCUMENTS

| | | | |
|---|---|---|---|
| 3,790,910 | 2/1974 | McCormack | 364/558 |
| 4,377,851 | 3/1983 | McNamara | 364/558 |
| 4,406,157 | 9/1983 | Mujahara et al. | 364/558 |
| 4,593,370 | 6/1986 | Balkanli | 364/558 |

*Primary Examiner*—Felix D. Gruber
*Assistant Examiner*—Danielle B. Laibowitz
*Attorney, Agent, or Firm*—Oblon, Fisher, Spivak, McClelland & Maier

[57] ABSTRACT

A vibrating cylinder pressure transducer system with an incorporated error correction circuitry is disclosed. The compensation circuitry includes a microcomputer, a frequency counting circuit and a arithmetic processor. The system further provides for digital temperature measurement and compensation. The characterizing equation of the vibrating transducer is solved by the microcomputer and the arithmetic processor in order to provide a thermal compensated, highly accurate digital output indication of the measurement of pressure in a single self-contained unit which is small in size and which provides a direct engineering unit output thereby eliminating the need for a further and separate dedicated computer in order to obtain pressure measurements.

8 Claims, 5 Drawing Figures

DIGITAL PRESSURE TRANSDUCER AND CORRECTIONS CIRCUITRY SYSTEM

BACKGROUND OF THE INVENTION

1. Field of the Invention

The present invention relates to a pressure transducer system which provides a digital signal indicating a measured pressure.

2. Description of the Prior Art

Systems which provide for pressure measurement utilizing variable frequency pressure transducers have been established in the prior art. Such systems operate by measuring the time necessary to count a predetermined number of cycles of a variable frequency signal and converting this time period to a digital signal which varies linearly with oscillator frequency. The digital signal can then be manipulated by digital computers to provide a digital output signal which varies linearly with pressure.

Digital outputs are provided from the resonant frequency of a stressed element (beam, wire, cylinder, etc.). Varying applied pressure causes a shift in elements resonant frequency which can be converted into engineering units by measuring and then scaling the output frequency through a polynomial equation. These digital transducers eliminate many of the systematic and parasitic errors found in analog transducer systems.

Although the transducers of this type provide adequate performance in most instances they are not user friendly. The user must generally supply additional hardware and software engineering to integrate the transducer into a particular application. In addition to measuring frequency, a multi-term equation is generally required to resolve pressure into usable engineering units.

Another problem with the prior art type of device is that, if a wide operational ambient temperature is expected, the user is responsible for providing a means of temperature stabilization or compensation because most of these standard type secondary transducers do not include thermal compensation. This additional engineering may be prohibitive for the casual or nontechnical user except for very high volume applications.

Prior art systems, aside from providing a need for additional hardware and software engineering to integrate the output of the transducer into a particular useful output measurement, also utilize transducer elements which require conversion from the measurement of a change in an electrical quantity, which is analog, to a digital format. For example, if the change brought about by the pressure measurement affects an electrical quantity such as capacity a further conversion must be made by means of an oscillator, for example, in order to provide a digital output.

An example of the prior art type of pressure transducer and circuitry is disclosed by the U.S. Pat. No. 3,790,910 to McCormack which provides a conditioning circuit for a capacitance type diaphragm measurement of the pressure. In this device the pressure affects a diaphragm which is mechanically coupled to control the value of a variable capacitor which is in turn connected to a transformer and a variable frequency oscillator. The output signals from the variable frequency oscillator are controlled by a counting and correction circuitry including a read only memory which stores constants related to the particular characteristics of the transducer which is used. A counter and an associated register obtain a digital signal indicative of the oscillator frequency. This system of the prior art functions by providing temperature compensated digital output signals by converting the variable frequency oscillator output signal to a rationalized digital signal which increases monotonically with oscillator frequency and has a predetermined value at a reference frequency. There is also included in this system a temperature indicator which provides an analog signal which is converted to a digital signal representative of transducer temperature. This conversion from the analog temperature to a digital temperature is accomplished by a computer which needs to be externally connected to the device of McCormack. The computer performs the calculations on the output digital signal from the frequency oscillator after the signal has been rationalized and further combines the measured digital temperature in order to provide a linearlized temperature compensated digital pressure signal which varies linearly with pressure in accordance with a predetermined mathematical function depending upon the rationalized digital signal and constant which is stored in the read only memory.

The main drawback to the device of the type disclosed in the McCormack patent is the need for a separate computer for each of the transducers in order to solve the equations and to provide the necessary software support to solve the equations. Other disadvantages of this type of prior transducers include the need for a relatively large power supply and the long warm up time as well as a vibration sensitivity. Needless to say because of the need for the computer associated with each device as well as the construction of the complicated circuitry of the device there existed a problem with regard to the expense involved in the construction of each device as well as the support necessary through the computer requirements.

SUMMARY OF THE INVENTION

Accordingly, it is an object of the present invention to provide a digital pressure transducer and correction circuitry which is a complete package and which does not require any external computer supports.

It is also an object of the invention to provide a transducer system which provides direct digital output to the correction circuitry and which provides an increased sensitivity and decreased size when compared to prior art systems.

The above objects are obtained according to the present invention by a vibrating pressure transducer and correction circuitry which utilizes a vibrating cylinder pressure transducer which provides a direct and extremely accurate direct digital read out in conjunction with a processor compensation circuit utilizing a microcomputer, an arithmetic processor and diode voltage measurements circuitry all mounted on a multilayer printed circuit board which contains all necessary instrument firmware and transducer calibration coefficients stored in the EPROM of the microcomputer.

It is a further object of the invention to provide a self-contained transducer and correction circuit system to be incorporated in a small package utilizing high density printed circuit boards mounted around the vibration cylinder of the transducer element. The structure of the circuit boards utilizes four circuit boards including a driver and frequency sensing card, a power supply card, an interfacing card and the processor compensation card.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
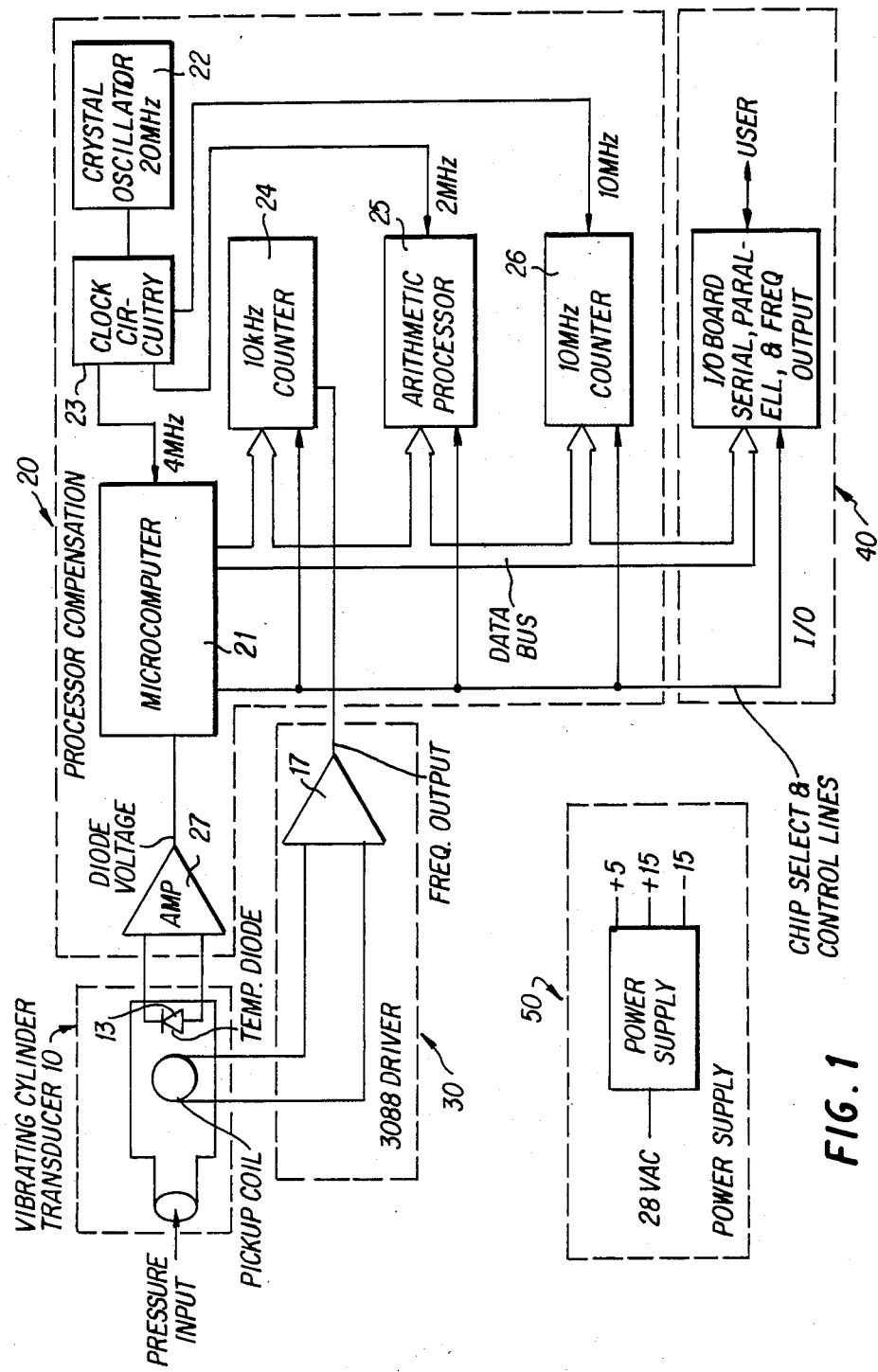
FIG. 1 is a block diagram of the transducer and error correction system of the present invention.

Referring now to the drawings, wherein like reference numerals designate identical or corresponding parts throughout the several views, and more particularly to FIG. 1 thereof, there is shown a block diagram of the transducer and correction circuitry of the present invention. The system utilizes a vibrating cylinder transducer 10 detailed in FIG. 2. This pressure transducer which develops the pressure standard to be used by the correction circuitry is a Solartron model 3088 vibrating cylinder pressure transducer which has been selected because of its excellent stability ($\pm 0.01\%$ FS/yr) and because it provides integral thermal compensation with each unit. Additionally the model 3088 is of a small size and is insensitive to low frequency vibration (<5 KHZ).

The pressure transducer 10 is designed to measure absolute air pressure by measuring the change in the resonant frequency of a vibrating cylinder 12 which encloses between the cylinder 12 and the housing 11 a reference vacuum. This cylindrical sensing element is fabricated from a Ni-Span C alloy and is formed into a thin wall cylinder. The cylinder 12 is excited into a hoop mode resonance by an electromagnetic drive coil 14. The cylinders resonant frequency is measured by another set of pickup coils 16 whose output is fed through a comparator 17 and amplified. The output of the comparator 17 is then used to drive the excitation or drive coils 14. This feed back of the output of the amplitude 17 is accomplished by use of the oscillator 15 which outputs the particular drive coil signal. The oscillator 15 is powered by the power supply 50.

Figure 3:
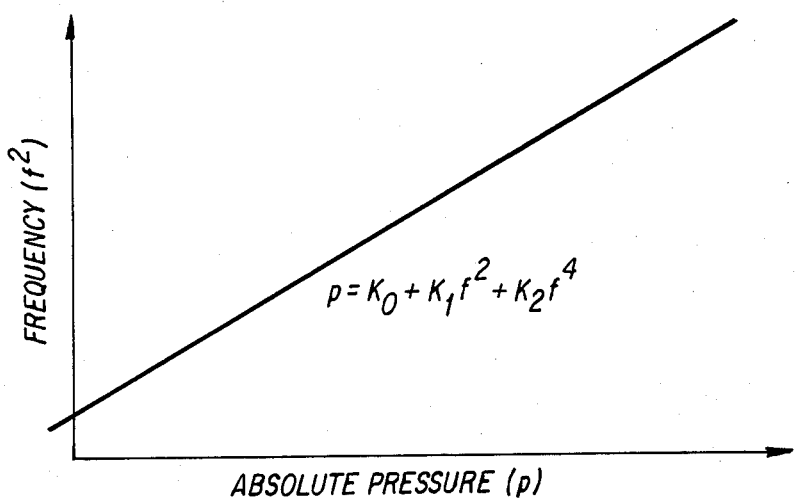
FIG. 3 is a graph of the relationship between the frequency and the absolute pressure detected by the pressure transducer of FIG. 2.

The measurement pressure is fed at the input 18 to the inside of the cylinder 12 with the vacuum reference being maintained outside of the cylinder 12 as shown in the Figure. The resonant frequency of the cylinder varies directly as a function of the mechanical stress exerted by the pressure differential across the cylinder. The resonant frequency increases as the applied pressure is increased as indicated by the graph of FIG. 3.

The resonant frequency of the vibrating cylinder 12 is dependent on the physcial properties of its mass, stress, elasticity, dimensions and temperature. Frequency can be accurately related to applied stress (pressure) by minimizing the changes in all of the other properties. This is accomplished by the Solartron model 3088 of FIGS. 1 and 2 through the use of Ni-Span C (iron nickel alloy) with proprietary fabrication techniques being used to minimize the effects of the materials mass, dimension, elasticity and temperature stability.

Each transducer which is used has a unique calibration with coefficients supplied from each unit being in the form of:

$$P = K_0 + K_1 F^2 + K_2 F^4$$

where $K_0 = C_{00} + C_{01}V_d + C_{02}V_d^2 + C_{03}V_d^3 + C_{04}V_d^4$
$K_1 = C_{10} + C_{11}V_d + C_{12}V_d^2 + C_{13}V_d^3 + C_{14}V_d^4$
$K_2 = C_{20} + C_{21}V_d + C_{22}V_d^2 + C_{23}V_d^3 + C_{24}V_d^4$
P = Unknown Pressure
F = Cylinder Frequency
$V_d$ = Cylinder Diode Junction Voltage This characteristic equation for each transducer contains 15 terms and this provides for a correction for all transducer zero, sensitivity, nonlinearlity and thermal errors. The thermal errors are compensated by measuring the junction voltage of a silicon diode 13 shown in FIG. 1 which has been bonded to the base of the cylinder. This junction voltage from the silicon diode 13 is proportional to the cylinder temperature. The original factory calibration for each unit includes 11 pressures each measured at seven different temperatures. The diode voltage is measured at each temperature and this data is used in the coefficient calculation algorithm above. In other words, each Solartron model 3088 comes complete with each of the coefficients $C_{00}$–$C_{04}$, $C_{10}$–$C_{14}$ and $C_{20}$–$C_{24}$ being given as result of these factory calibrations.

The design of the driver circuitry as well as the error correction circuitry including the processor compensator 20, the power supply 50 and the input/output board 40 is such that this circuitry added little additional error to the measurement and is of a small size to provide for a small volume package so that the microcomputer being built into the instrument provided for not only the compensatory algorithm calculation but also a flexible means for various interfaces to be designed with the instrument.

The block diagram of the pressure transducer and correction circuitry of FIG. 1 provide a circuit having four functions. They are used to measure the frequency, measure the diode junction voltage, calculate pressures in engineering units and interface with other equipment. The essence of the correction circuitry provided by the processor compensator 20 is the microcomputer 21 which contains within a single silicon chip, a processor, the RAM, the EPROM, a timer, a A/D converter and the bi-directional I/O lines. An example of such a system which can be utilized with the present invention is the Motorola M68705R3 microcomputer which contains on the one chip an 8 bit microprocessor, 112 bytes of Random Access Memory, 3776 bytes of Erasable Programmable Read Only Memory (EPROM), an 8 bit timer, an 8 bit A/D converter, and 24 bi-directional I/O lines. The use of this microcomputer significantly reduces the total number of discreet components required as compared to utilizing a discreet microprocessor design.

The raw frequency output of the vibrating cylinder transducer 10 is measured by counting a 10 MHZ clock 26 which is controlled by the output of the crystal oscillator 22 fed through the clock circuitry 23. This frequency is counted for up to 256 periods of the transducer frequency output. Raw frequency from the transducer 10 is first shaped into a square wave by the comparator 17 with the output of the comparator 17 being fed into the 10 KHZ counter 24 which has been preset to provide a reset pulse at the end of the 256 output period from the transducer. The 10 MHZ counter 26 then accummulates pulses from the highly stable output of the clock circuit 23 until the reset pulse is received from the 10 KHZ counter 24. The 10 MHZ clocking for the counter 26 is generated by the temperature compensated (5 ppm/100° C.) crystal oscillator 22. Using this technique, high resolution is obtained without a long integration time. For example, the transducer frequency measurement uncertainty is less than 0.002% F.S. (Full Scale).

The voltage from the diode junction 13 is amplified by the signal conditioning amplifier 27 and then quantized by an 8 bit ratiometric A/D converter contained in the microcomputer. The root sum squared (R.S.S.) error for all analog components in the circuitry is ±0.5%. Accuracy and resolution for this circuit is augmented through digital averaging, in the microcomputer, of the several measurements. This type of measurement provides for sufficient accuracy to correct for the 1% uncompensated thermal error of the vibrating transducer 13. The technique provides thermal compensation of better than ±0.0002%/°C. over the operational temperature of the device.

The 15 original calibration coefficients $C_{00}-C_{04}$, $C_{10}-C_{14}$ and $C_{20}-C_{24}$ are "burned" into the EPROM of the microcomputer 21 which solves the characterizing equation $P=K_0+K_1F^2+K_2F^4$ by using the firmware which also resides in the EPROM after both the raw frequency and the diode junction voltage have been measured from the transducer 10. The calculations are performed by the use of four byte floating point arithmetic and are processed at high speed by using the arithmetic processor 25 which may be, for example, the arithmetic processor AM9511. In addition to providing high throughput, the arithmetic processor provides high arithmetic resolution. The correction circuitry encompassing the arithmetic processor is able to measure and calculate pressure in engineering units up to 40 times per second.

The circuitry of the I/O (Input/Output) circuitry permits a flexible interface which can be configured to provide parallel, serial or frequency output. Additionally, if desired, an analog voltage or current output can be provided with the addition of a high resolution D/A (Digital/Analog) converter.

Figure 2:
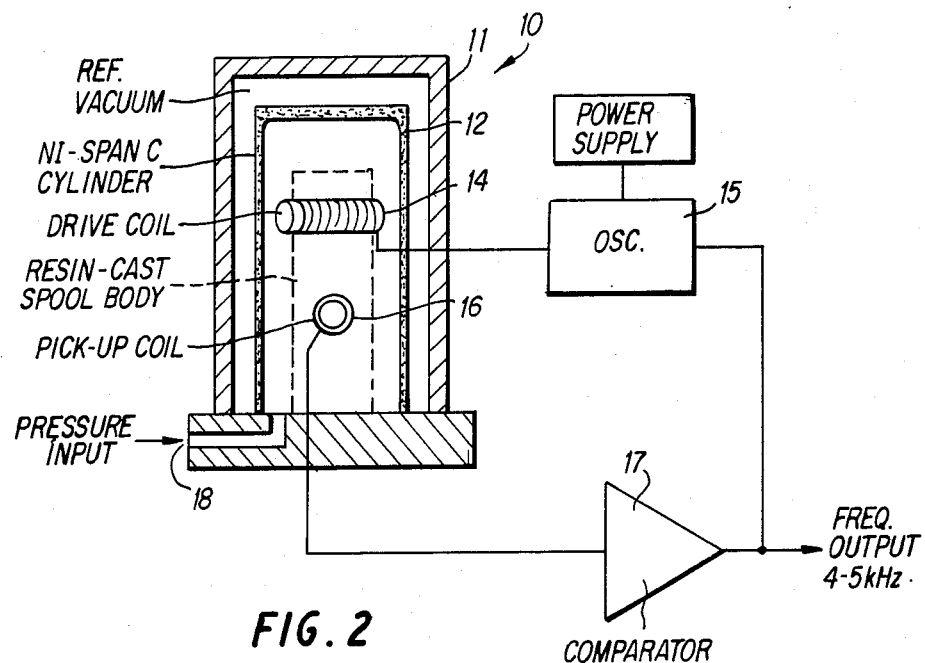
FIG. 2 is a diagram of the pressure transducer element utilized in FIG. 1.

The driver circuitry 30 of FIG. 1 which contains the comparator 17 also shown in the FIG. 2, provides drive signals to the magnetic coils 14 of the vibrating cylinder 12 with the comparator 17 providing amplification and pulse shaping circuitry to amplify the resonant frequency which is sensed by the pickup coil 16 on the transducer 10. The FIG. 2 details that the output of the comparator 17 is fed back through the oscillator 15 to the drive coil 14 with the power supply card circuit 50 containing DC-DC voltage converters required to permit single power supply operation. The power source of FIG. 2 for providing power for the oscillator 15 is one of the voltages supplied by the power supply card 50.

The I/O card 40 contains all interfaces to external equipment with parallel interfaces including either a 20 bit parallel, 16 bit word, or 8 bit byte format. Frequency output in the correct engineering units is provided through the use of a Numerically Control Oscillator (NCO). Analog outputs of either voltage or current are provided by a 16 bit D/A converter (not shown). Each unique interface is contained on a separate and unique card permitting easy conversion to meet custom applications.

Prior to fabrication of prototypes, error analysis was performed on the instrument design. An operational temperature envelope between −25° and 70° C. was assumed for calculations. The errors were broken into static errors independent of environmental considerations and worst case thermal errors over the operational temperature range for both the transducer element and the correction circuitry. Static errors included both the effects of linearity, repeatability and hysteresis while the temperature errors include thermal instability and thermal hysteresis of the vibrating cylinder. The total static errors for the transduction element and the correction circuitry equaled ±0.008% while the thermal errors for the total instrument was ±0.015%.

The most important specification for a secondary pressure standard, next to the static accuracy, is its long term stability. The vibrating cylinder has a verified long term stability of ±0.01% F.S. (Full Scale)/per year. The design concepts of the components of the correction circuitry have been selected so they will not add significantly to the long term errors of the instrument.

Figure 4A:
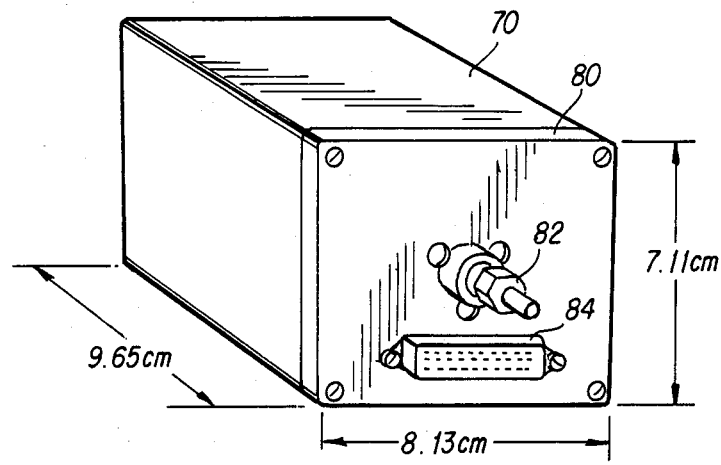
FIG. 4A is a view of the assembled pressure unit according to the present invention.
Figure 4B:
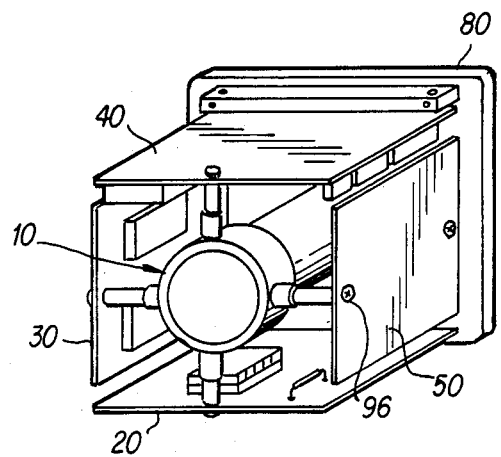
FIG. 4B is a brief review of the components of the transducer and the circuit board mounted correction circuitry of the FIG. 4A unit.

The FIGS. 4A and 4B show the constructed appearance of the instrument with the FIG. 4A showing the encased instrument having the covering 70 and the top plate cover 80 with the pressure inlet connection 82 being fed in through the top cover 80 and the instrument read out in engineering units being provided through the outlet connector 84. The top plate 80 has dimensions of 7.11 cm by 8.13 cm with the depth of the cover 70 being 9.65 cm which is almost entirely taken up by the length of the vibrating cylinder transducer element 10.

The FIG. 4B shows the completed structure of FIG. 4A without the protective cover 70. The structure shows the four circuit boards which make up the correction circuitry as has been previously detailed. The processor compensation card 20, the driver card 30, the input/output card 40 and the power supply card 50 are each fixedly spaced from the transducer element 10 by means of the screws 96. The FIGS. 4A and 4B clearly indicate that the instrument maintained the goal of minimizing the packaging in order to permit limited space applications and the discussion of the circuitry of the FIGS. 1-3 clearly indicate the accuracy and stability of the transducer element 10 were maintained while providing a digital output in corrected engineering units in a both serial and parallel formats.

The transducers which have been constructed according to the above-described specifications may be obtained according to the specifications for the pressure range desired. The units are available in ranges of 0 to 19, 0 to 38, 0 to 50 and 0 to 500 psia depending upon the desired application with the low range of 0 to 20 being primarily used in altimeter applications.

The following table lists the specifications for each of the four pressure ranges constructed in accordance with the particular desired pressure range:

| SPECIFICATION | PS1019 | PS1038 | PS1050 | PS1500 | UNITS |
|---|---|---|---|---|---|
| Pressure Range | 0–19 | 0–38 | 0–50 | 0–500 | psia |
| Repeatability | ±.002 | ±.002 | ±.002 | ±.005 | % F.S. |
| Hysterisis | ±.001 | ±.001 | ±.001 | ±.005 | % F.S. |
| Resolution | ±.0001 | ±.0001 | ±.0001 | ±.001 | psia |
| Achievable Accuracy | ±.01 | ±.01 | ±.01 | ±.01 | Over Full Pressure & Temp. Ranges & F.S. |
| Total Temperature Error - | | | | | |
| Digital Output (−25° C.–70° C.) | ±.0002 | ±.0002 | ±.0002 | ±.0002 | % F.S. |
| Analog Output | ±.001/°C. | ±.001/°C. | ±.001°/C. | ±.001°/C. | % F.S. |
| Long Term Stability (worst case) | ±.01 | ±.01 | ±.01 | ±.01 | % F.S. |
| Over Pressure Without CAL Shift | 60 | 110 | 150 | 1000 | psia |
| Over Pressure Without Damage | 100 | 190 | 250 | 1250 | psia |
| Vibration Sensitivity | ±.002 | ±.002 | ±.002 | ±.002 | % F.S./G |
| Acoustic Noise | Negligible up to 140 db @ 10 khz | | | | |
| Frequency Response | −3 db @ 10 hz | | | | |
| Shock | Performance Not Effected by 20 G, 11 Ms Duration in each Axis | | | | |
| Power Supply (standard) | +12 VDC ± @ 150 ma<br>−12 VDC ± @ 15 ma<br>+5 VDC ± @ 400 ma | | | | |
| Power Supply (optional) | +28 VDC ± 4 V @ .40 Amp<br>+12 VDC ± 2 V @ .75 Amp<br>+5 VDC ± .5 V @ 1.75 Amp | | | | |
| Operational Temperature Range | −25 to 70 | | | | |
| Media | Dry, Non-Corrosive Gases | | | | |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A digital pressure measuring system, comprising:
a vibrating cylinder pressure transducer having a vibrating cylinder located between a vacuum reference chamber and an input pressure chamber wherein said vibrating cylinder has resonant frequency induced electromagnetic coils and wherein the change in resonant frequency provides a measurement of the input pressure of said input pressure chamber;

pickup coil means provided to detect the resonant frequency of said vibrating cylinder;

drive means including a means to excite said electromagnetic coils and a means to measure and shape the output of said pickup coil means in order to provide a raw frequency output wherein said drive means further includes a means for feeding back said raw frequency output to said means to excite said electromagnetic coil wherein said input pressure is related to said raw frequency (F) by the characterizing equation $P = K_0 + K_1 F^2 + K_2 F^4$;

diode means for providing a voltage output indicative of the temperature of said transducer;

signal conditioning means for amplifying the output of said diode means to provide a diode junction voltage ($V_d$) wherein $K_0$, $K_1$ and $K_2$ are related to said voltage $V_d$ by
$K_0 = C_{00} + C_{01}V_d + C_{02}V_d^2 + C_{03}V_d^3 + C_{04}V_d^4$,
$K_1 = C_{10} + C_{11}V_d + C_{12}V_d^2 + C_{13}V_d^3 + C_{14}V_d^4$ and
$K_2 = C_{20} + C_{21}V_d + C_{22}V_d^2 + C_{23}V_d^3 + C_{24}V_d^4$ with $C_{00}$–$C_{04}$, $C_{10}$–$C_{14}$, $C_{20}$–$C_{24}$ being predetermined constant unique to said vibration transducers;

processor compensation means connected to receive said junction voltage $V_d$ and said raw frequency output F in order to provide an error corrected digital input pressure measurement, said compensation means comprising:

microcomputer means including an analog/digital converter for receiving said output junction voltage $V_d$ and outputting a digital equivalent of said voltage $V_d$, said microcomputer further including an EPROM storing said predetermined constants;

counter means including a first counter means receiving said raw frequency output and outputting a first signal after receiving a predetermined number of periods of said raw frequency, a second counter means for receiving said raw frequency output and counting pulses from a temperature compensated oscillator means until said first signal is output from said first counter means to thereby provide an accurate count of said raw frequency; and arithmetic processor means for calculating and processing said characterizing equation;

wherein said system further comprises a compensator input/output means for outputting the results of said calculation and processing of said characterizing equation in order to provide an accurate, error corrected digital measurement output of said input pressure.

2. The measuring system according to claim 1, wherein said first counter means is a 10 KHZ counter.

3. The measuring system according to claim 2, wherein said second counter means is a 10 MHZ counter.

4. The measuring system according to any one of claims 1, 2 or 3, wherein said oscillator means includes a 20 MHZ crystal oscillator and a clock circuit to clock said microcomputer, said 10 MHZ counter and said arithmetic processor.

5. The measuring system according to claim 1, further comprising a single power supply for providing power to said driver means and said processor compensation circuit.

6. The measuring system according to claim 5, wherein said driver, said processor compensator, said input/output means and said power supply are each contained on a respective printed circuit board.

7. The measuring system according to claim 6, wherein said transducer and said circuit boards are housed in a single package having a protective covering and a mounting plate with the longest dimension of said protective covering being essentially equal to the length of said transducer.

8. The measuring system according to claim 7, wherein said mounting plate has incorporated therein a pressure inlet connector which connects to said transducer and an output connector which provides external connection of the output of said input/output means.

* * * * *